Figure 1:
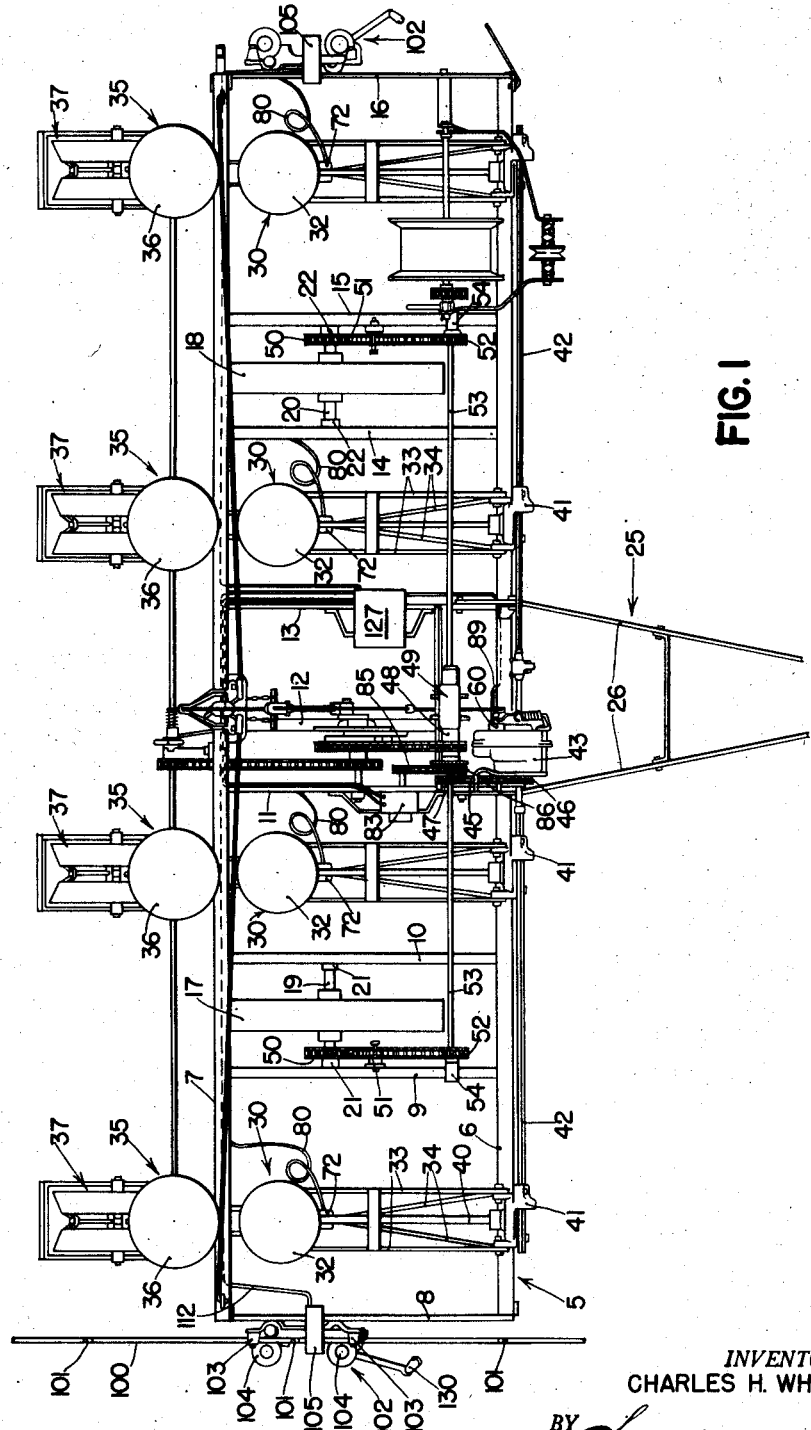

INVENTOR.
CHARLES H. WHITE

Oct. 10, 1950     C. H. WHITE     2,525,435
PLANTER
Filed Nov. 10, 1944     2 Sheets-Sheet 2
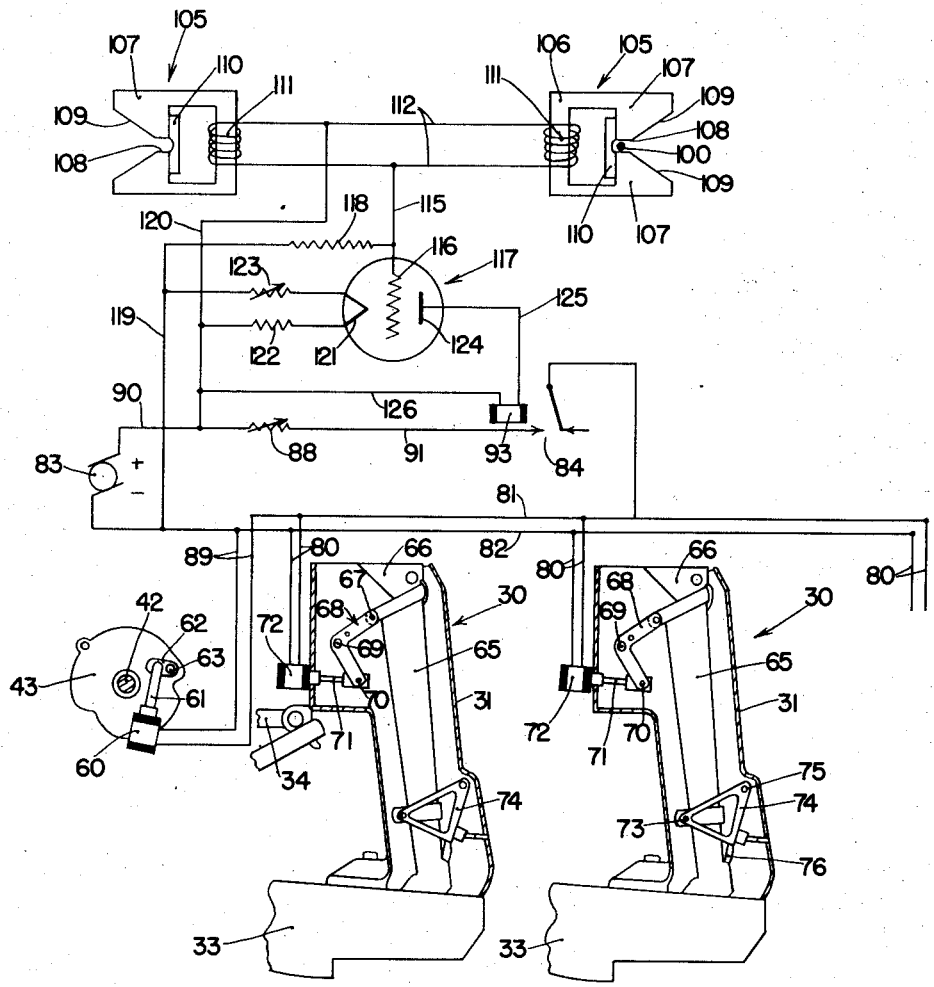
FIG. 2
WITNESS
E. B. Bjurstrom
INVENTOR.
CHARLES H. WHITE
BY 
ATTORNEYS

Patented Oct. 10, 1950

2,525,435

UNITED STATES PATENT OFFICE 2,525,435

PLANTER

Charles H. White, Moline, Ill., assignor to Deere & Company, Moline, Ill., a corporation of Illinois Application November 10, 1944, Serial No. 562,835

19 Claims. (Cl. 111—39)

The present invention relates generally to planters and more particularly to check-row planters of the class which employs a check wire laid across the field to be planted, which has check means spaced therealong to determine the interval between the groups or hills of seed, as is most commonly used for planting corn.

Heretofore, check-row planters employ a check wire having a series of knots, buttons, or other protuberances, which mechanically engage a check fork on the planter, the fork being mounted on a crank arm fixed to a rockshaft extending across the planter frame and having linkage connections with each of the planting mechanisms. As the planter travels across the field, the check fork engages each of the knots or buttons, successively, causing the fork to rock the rockshaft and thus transmit the actuating force to each of the planting mechanisms, as is well-known to those skilled in the art. The conventional planter is also provided with a seed selecting mechanism which usually receives power from the ground wheels of the planter but which also receives a control actuation from the rockshaft at each stroke of the check fork. This control actuation usually has the effect of causing an engagement of a self-interrupting type clutch. Thus, it is evident that since the check wire transmits the force necessary to actuate the clutch for the seed selecting mechanism and also to actuate the several planting mechanisms, of which there are two, three, or four on the commercial forms of check-row planters, the check wire and its knots or buttons must be constructed with considerable strength, and obviously an appreciable amount of space is required on the planter for the reel on which the wire is wound when not in use. One of the objects of my invention relates to the provision of a novel and improved check planting mechanism which employs substantially smooth check wire and does not require any appreciable force to be transmitted through the wire to operate the planting and seed selecting mechanisms.

Inasmuch as each of the planting mechanisms in the conventional planter is flexibly mounted on the planter frame so that it is free to float along the surface of the ground on the planter runner shoe during operation, it is evident that the actuating linkage which connects each planting mechanism with the rockshaft must be so related to the draft links by which the planting mechanism is propelled along with the planter frame, that the vertical floating movement of each planting mechanism is accommodated by such control linkage and does not affect the operation of the planting mechanism. Most conventional planters have a system of parallel links for connecting the mechanism to the frame and to the rockshaft, respectively, with the result that there is appreciable inertia in the mechanical connections between the check fork and the mechanism on each planting unit, which not only adds to the stress imposed upon the check wire but also is itself subject to considerable vibration and other stresses, particularlly when the planter is operated at the comparatively high speeds at which modern planters are operated. One of the principal objects of the present invention relates to the provision of a planter in which all of this mechanical linkage between the check fork and the planting mechanism is eliminated.

In the accomplishment of these objects, I have contemplated the use of electro-mechanical means mounted on each of the planting mechanisms and movable therewith as the planting mechanisms float along the ground during operation. Inasmuch as the electro-mechanical devices receive power for their operation through flexible wires, no actuating linkage between the frame and the planting mechanisms is required since the electro-mechanical devices can be directly connected to the operating elements of the planting mechanisms. A source of electrical energy is provided for propelling the electro-mechanical devices, in the form of a battery or generator mounted on the planter or on the tractor, thereby eliminating the necessity for transmitting force for this purpose through the check wire. Hence, it is necessary for the check wire to transmit only a series of control impulses for the purpose of controlling the energization of the various electro-mechanical devices simultaneously.

In order to utilize a check wire which is uniform throughout its length, without the necessity for knots, buttons, or other protuberances, in the preferred embodiment of my invention, I employ a check wire of paramagnetic material, the check intervals of which are imposed by magnetizing the wire in zones or spots spaced longitudinally of the wire. A suitable detector is mounted on the planter frame for receiving the wire as the planter moves forwardly in the field and for transmitting control impulses responsive to the passage of the magnetized spots through the detector, for controlling the energization of the electro-mechanical actuating devices.

In check-row planters, and especially in planters intended for operation at comparatively high speeds, such as in the order of five miles per hour, it is essential that when the seeds are ejected a sufficient amount of force is applied to them to eject them rearwardly at a velocity equal to the forward speed of travel of the planter, and thus causing the seeds to quickly come to rest in the ground without rolling and scattering. This action is inherent in those mechanical planting mechanisms which have the provision for ejecting the seeds rearwardly, for the check fork is actuated by the check wire at velocities proportional to the speed of travel of the planter. However, this action is not inherently found in an electrical planting mechanism and must be specially provided. Therefore, it is a further object of the present invention to provide an electrically operated planter which includes the provision of ejecting the seeds rearwardly with a velocity substantially equal to the forward speed of the planter. This is accomplished by controlling the voltage which is applied to the electro-mechanical actuating means so that the latter are actuated by a force necessary to produce the desired velocity. Thus, if the voltage impressed upon the actuating devices is approximately proportional to the speed of forward movement of the planter, the necessary amount of ejecting force is obtained. In the preferred embodiment of my invention I provide a variable voltage for this purpose in the form of a generator which is driven through a mechanical connection with the ground wheels of the planter, whereby the speed of the generator is directly proportional to the speed of forward travel and the generator used for this purpose is one in which the voltage is substantially proportional to the speed, at least within the normal range of variation of speed of the planter over the field.

These and other objects and advantages of my invention will be apparent to those skilled in the art after a consideration of the following description, in which reference is had to the drawings appended hereto, in which Figure 1 is a plan view of a four-row tractor drawn planter embodying the principles of the present invention.

Figure 2 is a schematic diagram of the circuit employed in the preferred embodiment.

Referring now to the drawings, the planter can be any conventional type known to those skilled in the art, such as for example, a planter such as the one disclosed in my co-pending application, Serial No. 385,977, filed March 31, 1941, issued as U. S. Patent No. 2,376,464, granted May 22, 1945 to which reference may be had for a full and complete description. Briefly, this planter comprises a mobile frame 5 comprising a pair of transversely disposed front and rear frame members 6, 7 interconnected by a plurality of laterally spaced longitudinally extending frame members 8, 9, 10, 11, 12, 13, 14, 15, 16. The frame 5 is carried on a pair of laterally spaced ground engaging wheels 17, 18, mounted on a pair of axles 19, 20, respectively. The axle 19 is journaled in a pair of bearings 21 mounted on a pair of the longitudinal frame members 9, 10, respectively, while the axle 20 is mounted in a pair of journal bearings 22 which are supported on the longitudinal frame members 14, 15, respectively. The planter frame 5 is drawn by means of a draft frame 25 comprising a pair of laterally spaced draft beams 26 secured to a pair of the longitudinal frame members 11, 13, respectively, and extending forwardly therefrom in converging relation. The forward end of the draft frame 25 is provided with a suitable hitch device (not shown) for coupling the same to the drawbar of a tractor.

Disposed within the hollow frame is a plurality of laterally spaced planting units, each unit being indicated in its entirety by reference numeral 30. Each of the units 30 is of conventional construction, preferably of the type shown and described in my Patent 2,340,163, granted to me January 25, 1944, to which reference may be had for a complete description of this type of planting unit. Each unit 30 comprises a generally vertically disposed hollow shank 31, the upper end of which carries a seed can 32 and the lower end of which is supported during operation on a planter runner or shoe 33. The seed can includes conventional seed selecting mechanism, including a rotatable seed plate (not shown), and the shank is connected to the frame 5 for generally vertical swinging movement by means of a pair of generally parallel links 33, 34 swingably connected between the shank 31 and the front frame bar 6, thereby providing for vertical floating movement as the implement advances along the ground.

Each of the planting units 30 is provided with a fertilizer unit 35 mounted on the rear frame bar 7 rearwardly of the associated planting mechanism 30. Each of the fertilizer units 35 includes a hopper 36.

A conventional press wheel 37 is disposed behind each of the fertilizer units and serves to press the ground firmly upon the seed and fertilizer in a manner well-known to those skilled in the art.

The seed selecting plate (not shown) in each of the planting units 30 is rotated intermittently by means of a drive shaft 40, which is connected through a pair of bevel gears (not shown) in a housing 41 with a transverse power shaft 42 journaled on the front frame bar 6. The drive shaft 40 swings vertically with the planting unit 30 and serves to rotate the seed plate to select the proper number of seeds to be deposited in each group or hill. The power shaft 42 is rotated intermittently by means of a clutch mechanism (not shown) disposed within a clutch housing 43 mounted on the front frame bar 6. The clutch mechanism may be of the type shown in Patent No. 2,147,726, issued to me on February 21, 1939, to which reference may be had for a complete description thereof. It is sufficient for present purposes to merely state that the clutch mechanism is of the self-interrupting type and serves to connect the power shaft 42 to a constantly rotating element within the housing 43, to be rotated through a predetermined angular displacement, after which the self-interrupting mechanism disconnects the shaft 42 from the constantly rotatable source of power. Power for this purpose is provided by a drive chain 45 which connects a sprocket 46 which is coupled to the constantly rotatable element within the clutch housing 43, and a drive sprocket 47 mounted on a drive sleeve 48 connected to the planet element of a differential gear mechanism 49. This differential gear mechanism, which is described in detail in my Patent 2,376,464 mentioned above, receives power from the two ground wheels 17, 18, for driving the sleeve 48. Each of the axles 19, 20 is provided with a sprocket 50 fixed to the respective axle and connected by a power transmitting chain 51 with a sprocket 52 fixedly mounted on a shaft 53. Each of the shafts 53 is journaled in an outer bearing 54 mounted on the frame and extends through the drive sleeve 48 into the differential mechanism 49. Thus, the two wheels 17, 18 drive the drive sleeve 48 at substantially constant speed by virtue of the differential mechanism 49, regardless of whether the planter is traveling in a straight line or around a turn.

The self-interrupting clutch mechanism is actuated by means of a solenoid 60 mounted on the end of the housing 43 and having a plunger 61 connected with a crank arm 62 fixed to a trip shaft 63, which, when rocked, effects an actuation of the self-interrupting clutch mechanism in a manner known to those skilled in the art.

Each of the planting mechanisms 30 includes a seed tube 65 disposed within the hollow shank 31, the upper end of the tube being disposed in telescoping relation to the lower end of a seed chute 66, which receives the seed from the seed selecting mechanism thereabove (not shown). The upper end of the seed tube 65 is connected by a pivot bolt 67 to one arm of a bell crank 68, the latter being pivotally mounted on a supporting pivot bolt 69 attached to the shank 31. The other arm of the bell crank 68 is pivotally connected by means of a bolt 70 to a plunger 71 of a solenoid 72. The lower end of the seed tube 65 is pivotally mounted by means of a pivot bolt 73 on a triangular crank member 74 which is swingably mounted on a pivot bolt 75 supported on the runner shank 31. When the solenoid 72 is energized, the plunger 71 moves toward the left as viewed in Figure 2, swinging the bell crank 68 in a clockwise direction about the pivot 69, thereby shifting the seed tube 65 downwardly. The downward movement of the seed tube 65 rocks the triangular crank member 74 in a counterclockwise direction about the pivot bolt 75, thereby imparting a downward and rearward movement to the lower end of the seed tube 65, while the counterclockwise movement of the crank member 74 swings open a gate member 76 which is mounted on the crank member 74 and serves to release the seed from the lower end of the seed tube and to expel it downwardly and rearwardly toward the ground, as explained in detail in my Patent No. 2,340,163.

The several solenoid coils 72 are connected by a pair of flexible leads 80 to a pair of supply wires 81, 82, which extend along the rear frame member 7 to each of the planting units and to which the flexible leads 80 of the coils 72 are connected in parallel. As indicated in Figure 1, the leads 80 are in the form of a two-conductor flexible cable, which is provided with sufficient length to accommodate the vertical movement of the planting unit 30 as the latter swings up and down on its parallel connecting links 33, 34. The supply wires 81, 82 receive energy from a small direct current generator 83, the circuit being normally open and under control of a relay 84. The generator 83 is mounted on one of the frame members 11 and is driven through a power transmitting chain 85 which is trained over a sprocket 86 on the drive sleeve 48. Thus, the generator 83 is driven from the ground wheels 17, 18 of the planter at a speed which is proportional to the speed of forward travel of the planter. The generator 83 is preferably of the type which generates a voltage substantially proportional to its speed of revolution, so that when the relay 84 is closed to energize the solenoids 72, the voltage impressed upon the latter is substantially proportional to the speed of travel of the planter. Therefore, since the force exerted by the solenoids 72 upon the seed tubes 65 is substantially proportional to the voltage impressed upon the coils, it is evident that the force with which the seed tubes 65 expel the seed downwardly and rearwardly as the planter moves forwardly, is substantially proportional to the speed of movement and this force can be adjusted by means of a variable resistor 88 in series with the relay 84, so that the seeds are expelled rearwardly at approximately the same velocity at which the planter moves forwardly, with the result that the seed drops vertically to the ground and thus does not roll and become scattered.

The solenoid 60, which actuates the trip shaft 63 of the clutch mechanism, is connected in parallel with the solenoids 72 by means of a pair of leads 89 connected with the supply wires 81, 82. Hence, the clutch mechanism is actuated simultaneously with the planting actuations, as is the case in conventional type planters. The positive side of the generator 83 is connected by a wire 90 to the variable resistor 88, the opposite side of the latter being connected by a wire 91 through the relay 84 to the supply wire 81. The other supply wire 82 is connected directly to the negative side of the generator 83.

The relay 84 is actuated by a solenoid coil 93, the control of which will now be described.

The planter is controlled by a check wire 100, which is laid across the field in any conventional manner known to those skilled in the art. The wire 100, however, is smooth and uniform in diameter and is made of steel of a high retentivity. The wire 100 is provided with check means in the form of magnetized zones or spots spaced along the wire at the intervals desired between planting mechanisms. These magnetized spots, which are indicated by reference numeral 101, are produced in the wire by subjecting the wire to a strong magnetic field, localized at the predetermined spots or zones, the remainder of the wire being in its normal non-magnetized state. The wire 100 may be painted or otherwise marked at these several spots, for the purpose of indicating their location, so that the proper intervals can be provided when the wire is repaired.

The planter is provided with a pair of check heads 102 disposed on opposite ends of the planter frame 5, respectively, and supported on the longitudinal end members 8, 16, for receiving the check wire 100 as the planter moves across the field. Each of the check heads 102 is provided with a pair of horizontal guide rollers 103 and a pair of vertical guide rollers 104 for guiding the check wire, and in most respects the check head is conventional, preferably of the type shown and described in Patent No. 2,315,752, granted to me on April 6, 1943. However, in place of the usual check fork, this check head is provided with a detecting device 105, which comprises a para-magnetic core 106 which is substantially U-shaped and has a pair of opposed pole pieces 107 separated by an air gap 108, within which the check wire 100 is adapted to travel transversely as the planter moves forwardly. The outer ends of the pole pieces 107 are beveled to provide a pair of inwardly converging faces 109 to facilitate placing the wire into the air gap 108, and the wire is retained within the air gap 108 by means of a strip 110 of non-magnetic material fastened across the inner edges of the pole pieces 107. A detector coil 111 is wound around the leg of the core 106, and the coils of the two detecting devices are connected in parallel by a two-conductor cable 112.

One of the conductors 112 is connected by a wire 115 to the grid 116 of the triode tube 117, which is also connected through a fixed resistor 118 by a wire 119 to the negative side of the generator 83. The other conductor 112 from the detecting coils 111 is connected by a wire 120 to the positive side of the generator 83. The filament 121 of the triode tube 117 is connected through a fixed resistor 122 and a variable resistor 123 to the positive and negative terminals of the generator 83, respectively. The plate 124 of the tube 117 is connected by a wire 125 with the relay solenoid 93, the other terminal of which is connected by a wire 126 to the positive side of the generator 83. The triode tube 117, the relay 84, and the resistors 88, 118, 122, 123, are contained within a control case 127 mounted on one of the longitudinal frame members 13 of the planter.

During operation, the check wire 100 is laid across the field and placed in the check head 102 on one side of the planter, with the wire in the air gap 103 of the associated detecting device 105. As each of the magnetized zones or spots 101 passes through the air gap between the pole pieces 107, a flux is set up within the magnetic core 106, which includes a voltage in the associated coil 111, which is imposed upon the grid 116 of the tube 117. This causes a current to flow in the plate circuit of the tube, which passes through the solenoid 93 and closes the relay 84. This results in energizing the solenoids 60, 72 from the generator 83, thereby causing an actuation of the clutch mechanism for the seed selecting devices, and each unit of the planting mechanism is actuated to plant a hill or group of seed. When the planter reaches the end of the field, the wire is doffed from the check head by means of the usual latch arm 130, which is engaged by the wire 100 by virtue of the increasing angle at which the latter enters the check head as the planter approaches the anchor stake at the end of the field, thereby opening the check head and dropping the wire to the ground. On the return trip, the wire is placed in the check head at the opposite end of the planter frame in a manner well known to those skilled in the art.

I do not intend my invention to be limited to the exact details shown and described herein, for various other embodiments of my invention will now be apparent to those skilled in the art. For example, should it be considered desirable to add further stages of amplification between the detecting devices and the relay solenoid 93, such amplification could be added in this circuit by anyone skilled in the art.

What I claim as my invention is set forth in the claims which follow.

I claim:

1. A planter comprising seed planting mechanism, electro-mechanical means energizable to actuate said mechanism to plant seeds, a source of electrical energy, a switch for connecting said source to said means to effect an actuation of said planting mechanism, a check wire adapted to be laid across the field to be planted and having a series of magnetic poles spaced therealong for determining the intervals between planting actuations, and inductive detecting means associated with said planter adapted to receive said check wire and across which the latter passes as the planter travels over the field, for closing said switch to energize said electro-mechanical means responsive to the passage of each of said magnetic poles thereacross.

2. A planter comprising a mobile frame, a plurality of laterally spaced seed planting mechanisms mounted thereon, a source of electrical energy, individual electro-mechanical devices mounted on said planting mechanisms, respectively, for actuating the same, a switch for connecting said source to said devices to effect simultaneous actuations of said planting mechanisms, a check wire adapted to be laid across the field to be planted and having a series of magnetic poles spaced therealong for determining the intervals between planting actuations, and inductive detecting means mounted on said frame adapted to receive said check wire and across which the latter passes as the planter travels over the field, said detecting means being connected to said switch for closing the latter to energize said devices simultaneously, responsive to the passage of each of said magnetic poles thereacross.

3. A planter comprising a mobile frame, a plurality of laterally spaced seed planting mechanisms mounted thereon, individual solenoids mounted on said planting mechanisms, respectively, for actuating the same, a check wire adapted to be laid across the field to be planted and having a series of magnetic poles spaced therealong for determining the intervals between planting actuations, a source of electrical energy, inductive detecting means mounted on said frame adapted to receive said check wire and across which the latter passes as the planter travels over the field, and electrical circuit means connecting said source of energy with said solenoids, said circuit means being controlled by said detecting means responsive to the passage of said magnetic poles thereacross for energizing said solenoids simultaneously to actuate said planting mechanisms.

4. A planter comprising seed selecting mechanism for predetermining the quantity of seed to be planted in each group or hill and seed planting mechanism for depositing the seed in the ground, an electro-mechanical device associated with each of said mechanisms for actuating the same, a check wire adapted to be laid across the field to be planted and having a series of magnetic poles spaced therealong for determining the intervals between said groups of seed, a source of electrical energy, inductive detecting means adapted to receive said check wire and across which the latter passes as the planter travels over the field, and electrical circuit means connecting said source of energy with each of said devices, said circuit means being controlled by said detecting means responsive to the passage of said magnetic poles thereacross for energizing said devices simultaneously to actuate said mechanisms.

5. A planter comprising a mobile frame, a plurality of laterally spaced seed planting mechanisms mounted thereon, seed selecting mechanism for predetermining the quantity of seed to be planted in each group or hill by said planting mechanisms, individual solenoids mounted on said planting and selecting mechanisms, respectively, for actuating the same, a check wire adapted to be laid across the field to be planted and having a series of magnetic poles spaced therealong for determining the intervals between planting actuations, a source of electrical energy, inductive detecting means mounted on said frame adapted to receive said check wire and across which the latter passes as the planter travels over the field, and electrical circuit means connecting said source of energy with said solenoids, said circuit means being controlled by said detecting means responsive to the passage of said magnetic poles thereacross for energizing said solenoids simultaneously to actuate said planting and selecting mechanisms.

6. A planter comprising seed planting mechanism, electro-mechanical means energizable to actuate said mechanism to plant seeds, a source of electrical energy, and control means for intermittently connecting said source to said electro-mechanical means to actuate said mechanism comprising a paramagnetic check wire adapted to be laid across the field and having a series of magnetized spots spaced therealong for determining the intervals between planting actuations, and detecting means adapted to receive said check wire and across which the latter passes as the planter travels over the field, said detecting means including a coil in which a voltage is generated responsive to movement of said magnetized spots relative thereto.

7. A planter comprising seed planting mechanism, electro-mechanical means energizable to actuate said mechanism to plant seeds, a source of electrical energy, and control means for intermittently connecting said source to said electro-mechanical means to actuate said mechanism comprising a paramagnetic check wire adapted to be laid across the field and having a series of magnetized spots spaced therealong for determining the intervals between planting actuations, detecting means adapted to receive said check wire and across which the latter passes as the planter travels over the field, said detecting means including a coil in which a voltage is generated responsive to movement of said magnetized spots relative thereto, and a switch actuable responsive to said generated voltage, for connecting said electro-mechanical means to said source of energy.

8. A planter comprising seed planting mechanism, electro-mechanical means energizable to actuate said mechanism to plant seeds, a source of electrical energy, and control means for intermittently connecting said source to said electro-mechanical means to actuate said mechanism comprising a paramagnetic check wire adapted to be laid across the field and having a series of magnetized spots spaced therealong for determining the intervals between planting actuations, detecting means adapted to receive said check wire and across which the latter passes as the planter travels over the field, said detecting means including a coil in which a voltage is generated responsive to movement of said magnetized spots relative thereto, an electronic tube having a filament, a grid, and a plate, a connection between said coil and said grid, and a solenoid actuated switch for connecting said electro-mechanical means to said source of energy and having its solenoid connected with the plate of said electronic tube.

9. A planter comprising a mobile frame, seed planting mechanism mounted thereon and including means for ejecting the seed rearwardly as the planter moves forwardly, electro-mechanical means for operating the seed ejecting means of said planting mechanism, a source of electrical energy, control means for intermittently connecting said source to said electro-mechanical means for actuating the latter, means responsive to the speed of travel of said planter, and connections between said electro-mechanical means and said planter speed responsive means for varying the force exerted by said electro-mechanical means upon the seed ejecting means of said planting mechanism to control the rearward velocity at which the seed is ejected.

10. A planter comprising a mobile frame, seed planting mechanism mounted thereon and including means for ejecting the seed rearwardly as the planter moves forwardly, electro-mechanical means for operating the seed ejecting means of said planting mechanism, a source of electrical energy having a variable voltage, control means for intermittently connecting said source to said electro-mechanical means for actuating the latter, means responsive to the speed of travel of said planter, and connections between said electro-mechanical means and said planter speed responsive means for varying the voltage applied to said electro-mechanical means to control the amount of force exerted upon said seed ejecting means by which the seed is ejected rearwardly.

11. A planter comprising a mobile frame, seed planting mechanism mounted thereon and including means for ejecting the seed rearwardly as the planter moves forwardly, electro-mechanical means for actuating said planting mechanism, a generator for supplying energy therefor, means for driving said generator at speeds proportional to the speed of forward travel of said planter to generate voltage which is substantially proportional to the speed of travel, and control means for intermittently connecting said generator to said electro-mechanical means for energizing the latter to actuate said planting means with substantially the amount of force necessary to eject the seed rearwardly at a velocity equal to the forward speed of travel, thus preventing the seed from rolling and scattering.

12. A planter comprising a mobile frame, a plurality of laterally spaced seed planting mechanisms mounted thereon, individual solenoids mounted on said planting mechanisms, respectively, for actuating the same and including means for ejecting the seed rearwardly as the planter moves forwardly, a check wire adapted to be laid across the field and having a series of check means spaced therealong for determining the intervals between planting actuations, a source of electrical energy, means responsive to the speed of travel for varying the voltage of said electrical energy, detecting means mounted on said frame adapted to receive said check wire and across which the latter passes as the planter travels forwardly, and electrical circuit means for imposing said voltage upon said solenoids, said circuit means being controlled by said detecting means responsive to the passage of said check means thereacross for energizing said solenoids simultaneously to actuate said planting means with substantially the amount of force necessary to eject the seed rearwardly at a velocity equal to the forward speed of travel, thus preventing the seed from rolling and scattering.

13. A planter comprising a mobile frame, a plurality of laterally spaced seed planting mechanisms mounted thereon, individual solenoids mounted on said planting mechanisms, respectively, for actuating the same and including means for ejecting the seed rearwardly as the planter moves forwardly, a check wire adapted to be laid across the field and having a series of check means spaced therealong for determining the intervals between planting actuations, a generator for supplying energy therefor, means for driving said generator at speeds proportional to the speed of forward travel of said planter to generate voltage which is substantially proportional to the speed of travel, detecting means mounted on said frame adapted to receive said check wire and across which the latter passes as the planter travels forwardly, and electrical circuit means for imposing said voltage upon said solenoids, said circuit means being controlled by said detecting means responsive to the passage of said check means thereacross for energizing said solenoids simultaneously to actuate said planting means with substantially the amount of force necessary to eject the seed rearwardly at a velocity equal to the forward speed of travel, thus preventing the seed from rolling and scattering.

14. A planter comprising a mobile frame, a plurality of laterally spaced seed planting mechanisms mounted thereon, individual solenoids mounted on said planting mechanisms, respectively, for actuating the same, and including means for ejecting the seed rearwardly as the planter moves forwardly, a generator for supplying energy therefor, means for driving said generator at speeds proportional to the speed of forward travel of said planter to generate voltage which is substantially proportional to the speed of travel, a paramagnetic check wire adapted to be laid across the field and having a series of magnetized spots spaced therealong for determining the intervals between planting actuations, detecting means adapted to receive said check wire and across which the latter passes as the planter travels over the field, said detecting means including a coil in which a voltage is generated responsive to movement of said magnetized spots relative thereto, means responsive to the voltage generated in said coil for connecting said generator with said solenoids to actuate said planting means with substantially the amount of force necessary to eject the seed rearwardly at a velocity equal to the forward speed of travel, thus preventing the seed from rolling and scattering.

15. An agricultural implement adapted to traverse a field, said implement comprising a mobile frame, mechanism mounted on said frame adapted to be actuated at spaced intervals as the implement travels over the field, electro-mechanical means for actuating said mechanism, means in said field for determining the distance from each point at which an actuation is desired to occur to the next point, said means comprising a check wire carrying a series of magnetic poles spaced therealong, said implement being movable across said field relative to said means and including an inductive detector mounted on said frame and cooperable with said distance determining means for effecting electrical energizations of said electro-mechanical means, to actuate said mechanism at each of said spaced points, successively.

16. An agricultural implement adapted to traverse a field, said implement comprising a mobile frame, mechanism mounted on said frame adapted to be actuated at spaced intervals as the implement travels over the field, electro-mechanical means for actuating said mechanism, a series of interval determining magnetic poles adapted to be positioned in said field prior to the movement of said frame thereover, and an inductive detector mounted on said frame and movable therewith past said series of magnetic poles for intermittently electrically energizing and deenergizing said electro-mechanical actuating means responsive to movement of said detector past said poles, respectively, for effecting actuations of said mechanism at the intervals predetermined by said poles.

17. A planter adapted to traverse a field to be planted, comprising a mobile frame, planting mechanism mounted on said frame adapted to be actuated to plant at spaced intervals as the planter travels over the field, electro-mechanical means for actuating said planting mechanism, a series of interval determining magnetic poles adapted to be positioned in said field and maintained in stationary position relative thereto prior to the planting operation, and an inductive detector mounted on said frame and movable therewith past said series of magnetic poles for intermittently electrically energizing and deenergizing said electro-mechanical actuating means responsive to movement of said detector past said poles, respectively, for effecting planting actuations of said planting mechanism at the intervals predetermined by said poles.

18. A mobile agricultural implement adapted to travel forwardly in operation, said implement comprising a frame, mechanism mounted on said frame adapted to be actuated at spaced intervals as the implement travels forwardly, electro-mechanical means for actuating said mechanism, means in the path of said implement for determining the distance from each point at which an actuation is desired to occur to the next point, a coil carried by said frame, cooperable means on said distance determining means and on said frame, respectively, responsive to relative movement therebetween for generating voltage impulses in said coil, and means responsive to said voltage impulses in said coil for energizing said electro-mechanical means to actuate said mechanism.

19. A mobile planting implement adapted to travel forwardly in operation, said implement comprising a frame, planting mechanism mounted on said frame adapted to be actuated at spaced intervals as the implement travels forwardly, electro-mechanical means for actuating said mechanism, means in the path of said implement for determining the distance from each point at which an actuation is desired to occur to the next point, a coil carried by said frame, cooperable magnetic elements on said distance determining means and on said frame, respectively, responsive to relative movement therebetween for generating voltage impulses in said coil, and means including an amplifier for energizing said electro-mechanical means to actuate said planting mechanism responsive to said voltage impulses in said coil.

CHARLES H. WHITE.

REFERENCES CITED

The following references are of record in the file of this patent:

UNITED STATES PATENTS

| Number | Name | Date |
| --- | --- | --- |
| 886,179 | Bragunier et al. | Apr. 28, 1908 |
| 1,252,923 | Moench | Jan. 8, 1918 |
| 1,948,559 | Bohmker | Feb. 27, 1934 |
| 2,177,803 | Ferte et al. | Oct. 31, 1939 |
| 2,400,562 | Marihart | May 21, 1946 |